US005702789A

United States Patent [19]

Fernandez-Kirchberger et al.

[11] Patent Number: 5,702,789

[45] Date of Patent: Dec. 30, 1997

[54] SET IN SHEET FORM AS WELL AS APPARATUS AND METHOD FOR PRODUCING SUCH A SET

[75] Inventors: Paul Fernandez-Kirchberger, München; Joachim Seidl, Rechtmehring, both of Germany

[73] Assignee: MTL Modern Technologies Lizenz GmbH, Munich, Germany

[21] Appl. No.: 447,973

[22] Filed: May 23, 1995

[30] Foreign Application Priority Data

| | | | |
|---|---|---|---|
| Jun. 8, 1994 | [DE] | Germany | 44 20 027.7 |
| Sep. 13, 1994 | [DE] | Germany | 44 32 544.4 |
| Mar. 8, 1995 | [DE] | Germany | 295 03 990 U |

[51] Int. Cl.[6] .......... B32B 3/10

[52] U.S. Cl. .......... 428/40.1; 283/81; 428/42.2; 428/42.3; 428/43; 428/57; 428/58

[58] Field of Search .......... 428/40.1, 42.2, 428/42.3, 57, 58, 43; 283/81

[56] References Cited

U.S. PATENT DOCUMENTS

| | | | |
|---|---|---|---|
| 3,674,614 | 7/1972 | Templeton | 428/43 |
| 3,920,122 | 11/1975 | Koehlinger et al. | 206/390 |
| 4,150,183 | 4/1979 | Reed | 428/42.3 |
| 4,944,978 | 7/1990 | Pipkins | 428/43 |
| 5,389,414 | 2/1995 | Popat | 428/40.1 |

FOREIGN PATENT DOCUMENTS

| | | |
|---|---|---|
| 7836775 | 12/1978 | Germany . |
| 4134288 | 7/1994 | Germany . |

*Primary Examiner*—Nasser Ahmad
*Attorney, Agent, or Firm*—Learman & McCulloch

[57] ABSTRACT

The invention relates to a set in sheet form as well as to apparatus and a method for producing such a set, which consists of at least one information carrier in card form with carrier material lying in the same plane, wherein the information carrier and the carrier material are completely separated from one another by means of uninterrupted stamped cuts or the like and For the releasable connection of information carrier and carrier material at least one narrow adhesive strip is provided which is coated with a glue on one side, covers at least a part of the stamped cuts between adjacent rows of information carriers and/or between information carriers and carrier material and adheres the components of the set to one another. The width of the information carriers perpendicular to the course of the adhesive strip amounts to a multiple of the width of the adhesive strip.

10 Claims, 7 Drawing Sheets

SET IN SHEET FORM AS WELL AS APPARATUS AND METHOD FOR PRODUCING SUCH A SET

The invention relates to a set in sheet form consisting of at least one information carrier in the form of a card with carrier material lying in the same plane as well as apparatus and a method for producing such a set.

BACKGROUND OF THE INVENTION

Arrangements of information carriers with carrier material are variously known in the prior art. They were originally available predominantly in roll form. In this case the arrangement of the information carriers in the set served and continues to serve for the automation and simplification of processing of the information carriers.

A set of information carriers and carrier material in roll form is described for example in U.S. Pat. No. 3,920,122. The information carriers in card form which are described there are separated from the strip of carrier material by a stamping; the separation takes place in this example by means of a kind of line of perforations in a specific configuration which is intended to allow the border of an information carrier released from the carrier material to appear as smooth as possible.

A set of information carriers and carrier material in sheet form is disclosed for example in U.S. Pat. No. 4,944,978. Here the separation of the information carries from the carrier material is achieved by long circular cuts; the circle is only partially closed in the cut produced by stamping. Thus small bridges remain between the information carriers and carrier material which give the set sufficient strength for printing of the information carriers and must be severed during the subsequent further processing of the information carriers. Since the bridges have a thickness which corresponds to the thickness of information carriers and carrier material, and since the width of the bridges also cannot be ignored, after the removal of each information carrier the separation points have parts remaining from the separation on the edge of the information carrier in the form of irregularities of the edge such as, with current quality requirements, is tolerated only in certain areas. For high-quality applications, for example in the case of visiting cards, labels on high-priced articles, name badges at conventions etc., arrangements according to the prior art cannot be used because of the unsightliness of the end product. However, for the high-quality applications addressed above there is a considerable requirement for a set of information carriers and carrier material in sheet form. With appropriate design, such a set makes it possible to produce information carriers which on the one hand have a high-quality fixed print, particularly in colour, and on the other hand can be additionally overprinted with variable information; in this case it should always be assumed that the information carrier when ready for use must have an unblemished appearance.

Visiting cards are a good example of an application of a set in sheet form. Visiting cards have an overwhelming importance in modern business life not only because of the record of the company and the name but also increasingly because of other information, such as telephone number, extension numbers, fax number, car phone number, address or a mailbox etc. In particular this supplementary information changes not infrequently due to moving, transfer or promotion. Also, when new staff are appointed it will be desirable to provide them quickly with visiting cards.

Thus while it may be assumed that some of the information on a visiting card, such as the company logo, company name and other elements of the corporate identity remain the same for a long time, other items of information change in a comparatively short time.

The conventional printing of visiting cards using the offset process is comparatively expensive because of the small print runs and therefore is only justified where individual members of staff require particularly large quantities of visiting cards.

Thus in the range of small and very small print runs it is desirable to make it possible for visiting cards with preprinted permanent information which applies to all or many members of staff to be provided quickly, neatly and prestigiously with the variable information which applies in the individual case.

A method which can be used for this is described in DE-B-41 34 288. This prior art teaches that card material in sheet form is first of all printed using offset or screen printing, then this material is shaped into individual labels or other information carriers in such a way that adjacent information carriers still remain connected by a tiny micro-link so that the set thus formed is then supplemented by means of a conventional desktop sheet printer and then the information carriers are removed from the set.

This known method constitutes a large step in the right direction, but cannot be used where during removal of the individual information carriers tiny remainders of the few small micro-links still remaining on the edges of the information carriers are disruptive.

The importance of a completely satisfactory edge to the finished information carrier is known and has also already led to finished stamped-out information carriers being adhered onto a carrier film and removed from the carrier film after the final printing with the variable information. This further prior art naturally produced information carriers with a completely unblemished edge from a large palette of high-quality materials. However, it was a disadvantage that in order to avoid residues of adhesive a coating had to be applied to the back of the information carriers before they were adhered to the carrier film. This coating looked unnatural and precluded the back from being printed, which in a large number of cases is desirable, for example in the case of bilingual visiting cards. A noticeably more serious shortcoming of this known proposal was that peeling off of the individual information carriers from the carrier film required a certain amount of effort and above all it very frequently resulted in the peeled off information carriers being slightly bent, seriously impairing the appearance. This conceivably undesirable bending can already be observed when comparatively thin self-adhesive labels are removed from their carrier film; however, the danger of curving grows with the increasing thickness of the carrier material.

The object of the invention, therefore, is to create a set in sheet form in which one- or multi-colour printing of small runs of information carriers in card form using offset and/or desktop printers can be made more economical and improved in quality by comparison with the prior art. Furthermore, apparatus and a method for producing such a set should be provided.

SUMMARY OF THE INVENTION

The proposed means for achieving the object brines with it a number of advantages.

First of all it should be pointed out that the edges of the information carriers separated from the carrier material are unblemished. Furthermore the backs of the information carriers are also unblemished and capable of being printed on. Moreover it can even be imagined that higher-quality information carriers, for example made from thin plastic, might be set in a cheap carrier material and connected in the manner according to the invention or even that an individual information carrier might be surrounded with a larger area of carrier material in order for example to be able to produce a membership pass in the laser printer of an organisation, which as is known requires a certain minimum size of the carrier material to be drawn in.

The proposed solution is also of considerable advantage in so far as the forces to be applied for detaching the information carriers are clearly smaller than in the prior art, so that the danger of bending of the information carriers is also eliminated. In addition the material requirement for the adhesive strip is substantially less than for the carrier film of the prior art which was provided over the whole surface with an adhesive which only allowed a single bond. Finally, the time saved on removing from the carrier material a number of information carriers belonging to one set is considerable. Since at least one end of all adhesive strips is adhered to one edge region of the carrier material, this edge region can be gripped and drawn downwards over the edge of a desk or the like, whilst the sheet is easily guided with the other hand in the plane of the desk; in this way the individual information carriers were detached without problems practically with one single hand movement.

The possibility should also be emphasised of using a central strip of carrier material between adjacent rows of information carriers, which makes exact printing possible up to the subsequent separation point. Preferably the adhesive strips are adhered onto the subsequent back of the information carriers. When desktop printers with narrow material intake curves are used, however, the narrow adhesive strips can also be applied to the radially outer face of the sheets or the set, that is to say on the subsequent front face.

The solution according to the invention can also be advantageously used with continuous webs.

A continuous web which can be printed by machine and consists of a plurality of portions for inscription which are connected to one another is known from DE-U-78 36 775, in which the information carriers are connected to the carrier material lying in the same plane by means of perforations as tear lines on the boundary of the portions for inscription. If after printing of the information carriers the carrier material is separated from the information carrier, an untidy edge remains on the latter which is unsightly and does not satisfy high quality requirements. Moreover, it is complicated to detach the information carriers from the carrier material which is constructed with a row of sprocket holes.

With the set in sheet form according to the invention it is also possible with continuous webs for single- or multi-colour printing of small runs of information carriers in card form using offset and/or desktop printers to be made more economical relative to the prior art and to be further improved in quality.

Further embodiments of the invention are explained in greater detail on the basis of the following description of several embodiments and the drawings.

DETAIL DESCRIPTION

FIGS. 1 to 5 show various embodiments of a set in sheet form which comprises at least one information carrier in card form with carrier material lying in the same plane. The information carrier and the carrier material are completely separated from one another by means of uninterrupted stamped cuts or the like. For the releasable connection of information carrier(s) and carrier material at least one narrow adhesive strip is provided which is coated with a glue on one side, cover at least a part of the stamped cuts between adjacent rows of information carrier and/or between information carriers and carrier material and adheres the components of the set to one another. The width of the information carriers perpendicular to the course of the adhesive strip amounts to a multiple of the width of the adhesive strip.

Figure 1:
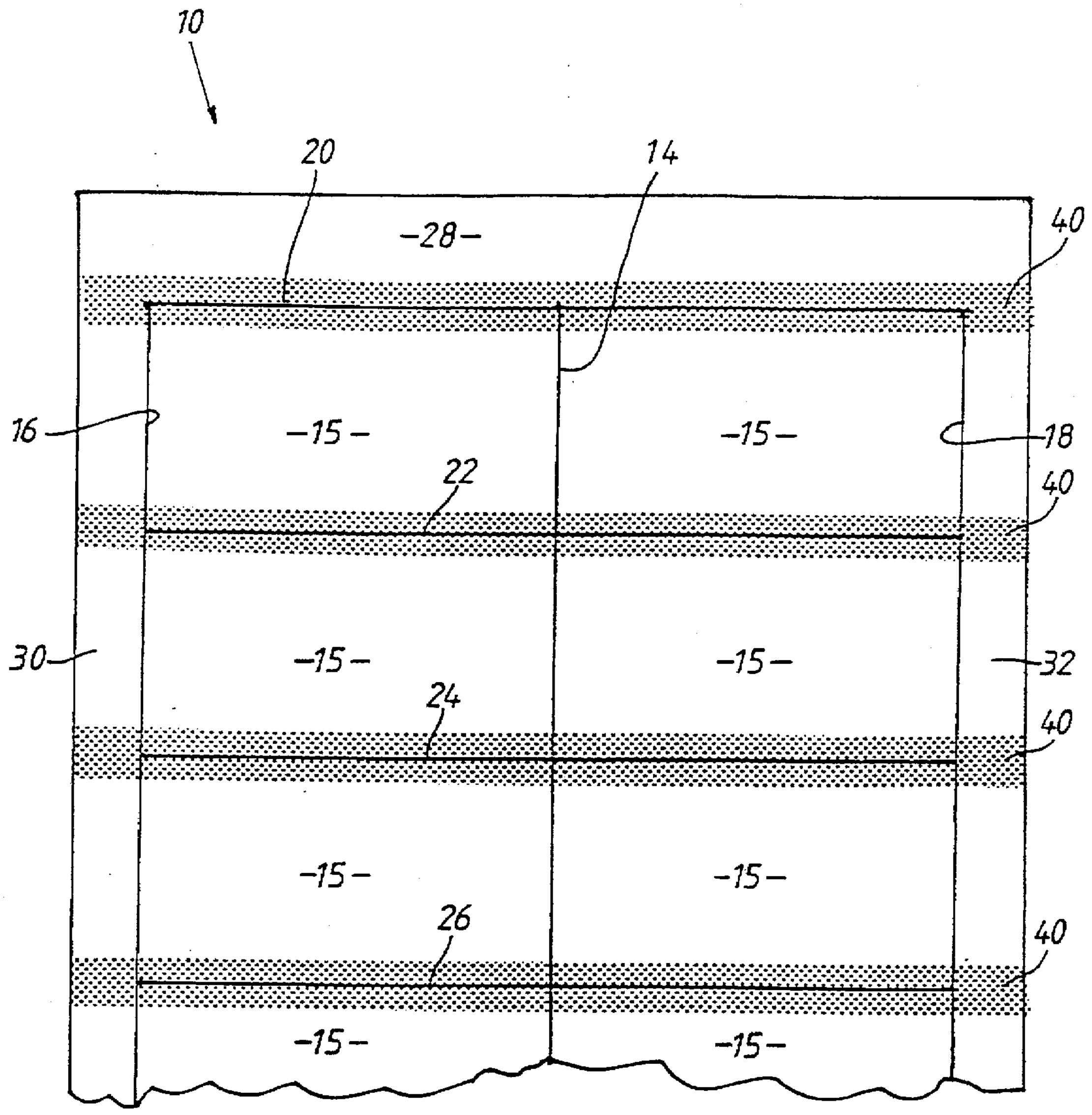
FIG. 1 shows a plan view of a set consisting or two rows of information carriers extending immediately side by side.

In FIG. 1 a first set 10 according to the invention is shown in plan view, which has disposed on both sides of a common stamping line 14 row of information carriers 15, of which six information carriers are shown complete and two in part in FIG. 1.

The row of information carriers 15 on the left in FIG. 1 is delimited on its left-hand side by a stamping line 16. The right-hand side of the right-hand row of information carriers 15 is delimited in an analogous manner by a stamping line 18. In the illustrated embodiment all stamping lines 14, 16, 18 run parallel to one another and are not interrupted. They end at their upper end in FIG. 1 at a transversely extending stemping line 20, which separates the two information carriers 15 which are uppermost in the drawing from an upper edge region 28 of the set 10.

Parallel to the said upper transversely extending stamping line 20 there are provided between each two information carriers 15 shown above one another in the drawing further stamping lines 22, 24, 26 which run through uninterrupted from the left-hand stamping line 16 up to the right-hand stamping line 18.

As can be seen in FIG. 1, in this embodiment there is to the left or the stamping line 16 a lateral (left-hand) edge region 30 and to the right or the stamping line 18 a lateral (right-hand) edge region 32. The three described edge regions 28, 30, 32 together form the carrier material of the set 10 which in this embodiment surrounds the group of information carriers 15 on all sides.

In FIG. 1 a total of four adhesive strips 40 are shown by cross-hatching which in practice have a width of less than 10 mm, preferably approximately 7 mm and are adhered on the set over the stamping lines 20, 22, 24, 26 in such a way that in each case they extend with approximately half of their width on one and the other side of the said stamping lines.

The adhesive strips 40 bear an adhesive on the surface facing the set 10 and can be easily removed therefrom without leaving behind remainders of the adhered surface of the information carriers.

As the sketched illustration also shows, the free ends of the adhesive strips 40 are led beyond the stamping lines 20, 22, 24, 26 as far as the edge regions 30, 32 of the carrier material and are there adhered to the edge regions. The preferred arrangement can also be seen, namely that the adhesive trips are only provided running parallel to one another. The consequence of this is that by gripping one of the edge regions 30, 32 and holding down the adjoining information carriers 15, the latter can be separated from the carrier material with one hand movement and only very slight exertion of force, although the adhesive force of the adhesive strips is sufficiently strong for the set to be printed without problems in a desktop printer, e.g. a laser or colour printer.

Figure 2:
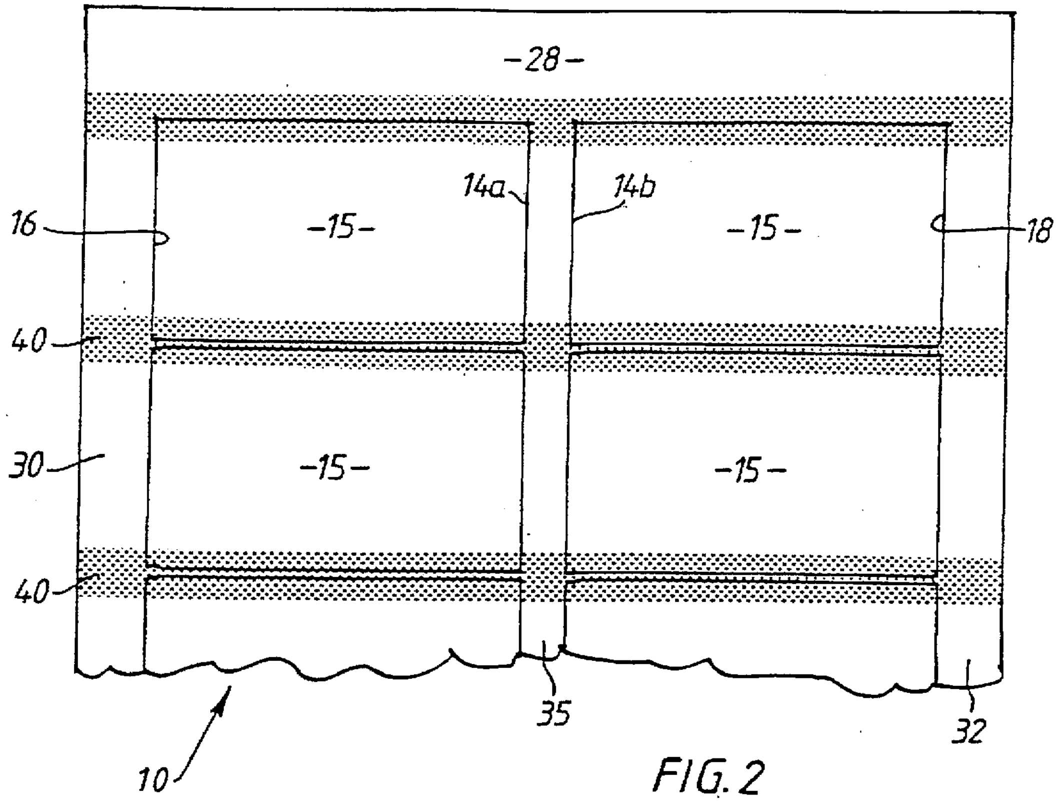
FIG. 2 shows a plan view similar to FIG. 1 with a central strip between the two rows of information carriers.

The embodiment shown in FIG. 2 differs from that according to FIG. 1 in that between the two rows of information carriers 15 a central piece 35 of the carrier material is inserted so that the one stamping line 14 in the embodiment first described becomes two parallel stamping lines 14_a_, 14_b_.

Furthermore, this embodiment shows how the various stamping lines 14 to 36 extend when the information carriers 15 have rounded corners. Otherwise the embodiment according to FIG. 2 does not differ from that of FIG. 1.

The central strip 35 facilitates neat and exact printing of the information carriers 15 up to the stamping lines 14_a_, 14_b_. In practice this requires the printer to be capable of printing a small distance to the side over the edge of the information carrier without thereby taking the laterally adjoining information carrier 15 in sympathy.

In the previously described embodiments both the upper edge region 28 and also one of the two lateral edge regions 30, 32 can be omitted, without impairing the operability of the set end the easy separation of the information carriers 15 in card form from the remaining edge region.

Figure 3:
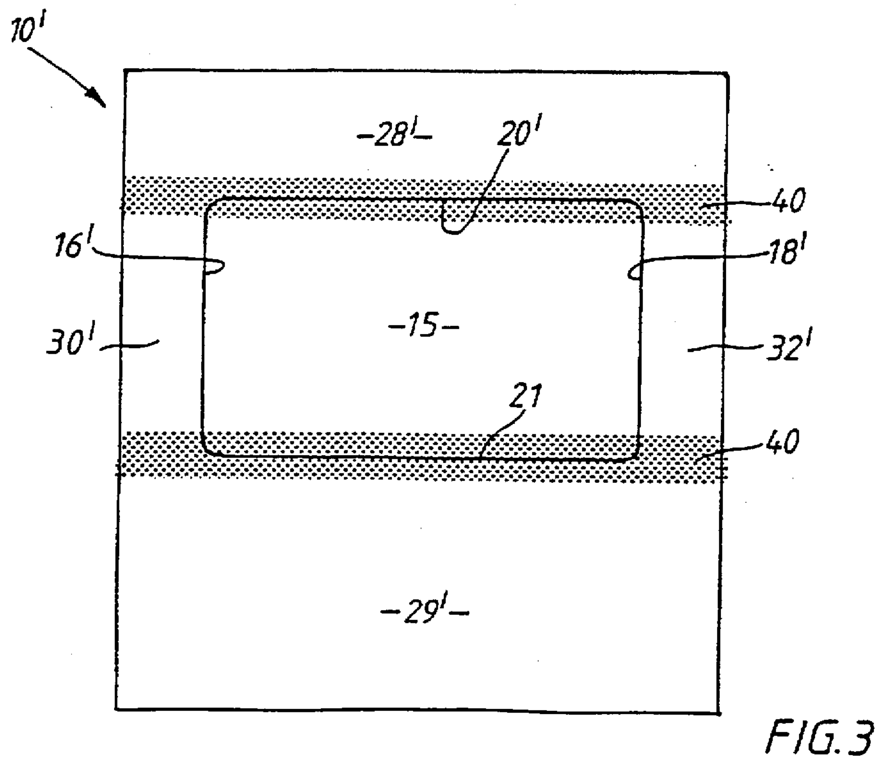
FIG. 3 shows a plan view of a set with one individual information carrier within a sheet of carrier material.

Whilst it may be imagined that the embodiments according to FIG. 1 and 2 consist of a sheet for example of DIN A4 size, in FIG. 3 a set 10' is shown for overprinting an individual information carrier 15 which is set into a carrier material of for example DIN A5 size.

Thus the set has a carrier material which has a large surface area in relation to the size of the information carrier 15 with a wide upper edge 28', a very wide lower edge 29' and two lateral edge regions 30', 32'. Since there is only one individual information carrier 15, the number of stamping lines is restricted to an upper stamping line 20', a lower stamping line 21', a left-hand stamping line 16' and a right-hand stamping line 18' Also in this embodiment it can be seen that the adhesive strips 40 extend into the edge region and are adhered there, so that also in the case of this embodiment it is possible to detach the information carrier 15 easily from the set 10'.

In the embodiments according to FIGS. 1 to 3 the alignment of the adhesive strips 40 is preferably transversely with respect to the direction in which the set 10, 10' runs during printing in a desktop printer or the like. Additional adhesive strips running vertically with respect to the adhesive strips 40 are dispensed with.

It is also worth mentioning that the information carriers 15 made from cardboard or plastic can be used not only for visiting cards or for high quality labels, but also as name badges for conferences, as table name labels, as invitation cards or admission cards, as credit cards, club cards, membership passes or the like and also for example as insert cards for files, registers and many other purposes. Also it may be imagined that someone acquires several copies of the set 10, 10' in sheet form and prints them with his own laser or colour printer with the complete information for the visiting cards, which could be appropriate in particularly small print runs and in this way leads to very economical but nevertheless high-quality products.

The edge regions and the information carriers in card form of the embodiments described above do not necessarily have to be made from the same material. It may be quite sensible for information carriers 15 made from plastic to be copied within the edge regions of the set in the manner illustrated in the drawings and then to be releasably fixed by means of the adhesive strips 40. Furthermore, the embodiments can be varied so that the information carriers have rounded corners; the stamping lines 16 and 18 would then extend with appropriate curves in the region of the stamping lines 20 to 26. The same applies for the transitions between the intersecting stamping lines 14, 22, 24 and 26. It may be easily imagined here that a stamping line enclosing the rounded corners or s corresponding portion of stamping line would border a star-shaped remainder of carrier material at the location of the points of intersection of the stamping lines in FIG. 1, end it may be further imagined that these star-shaped remainders would be retained on the layer of adhesive on the adhesive strip 40 when the information carriers 15 ere removed from the set.

All the stamping lines referred to above merge into one another, so that no bridges are formed from the material of the information carriers and/or from the material of the carrier material between adjoining parts of the set, and consequently each information carrier has an unblemished edge around it.

Figure 4:
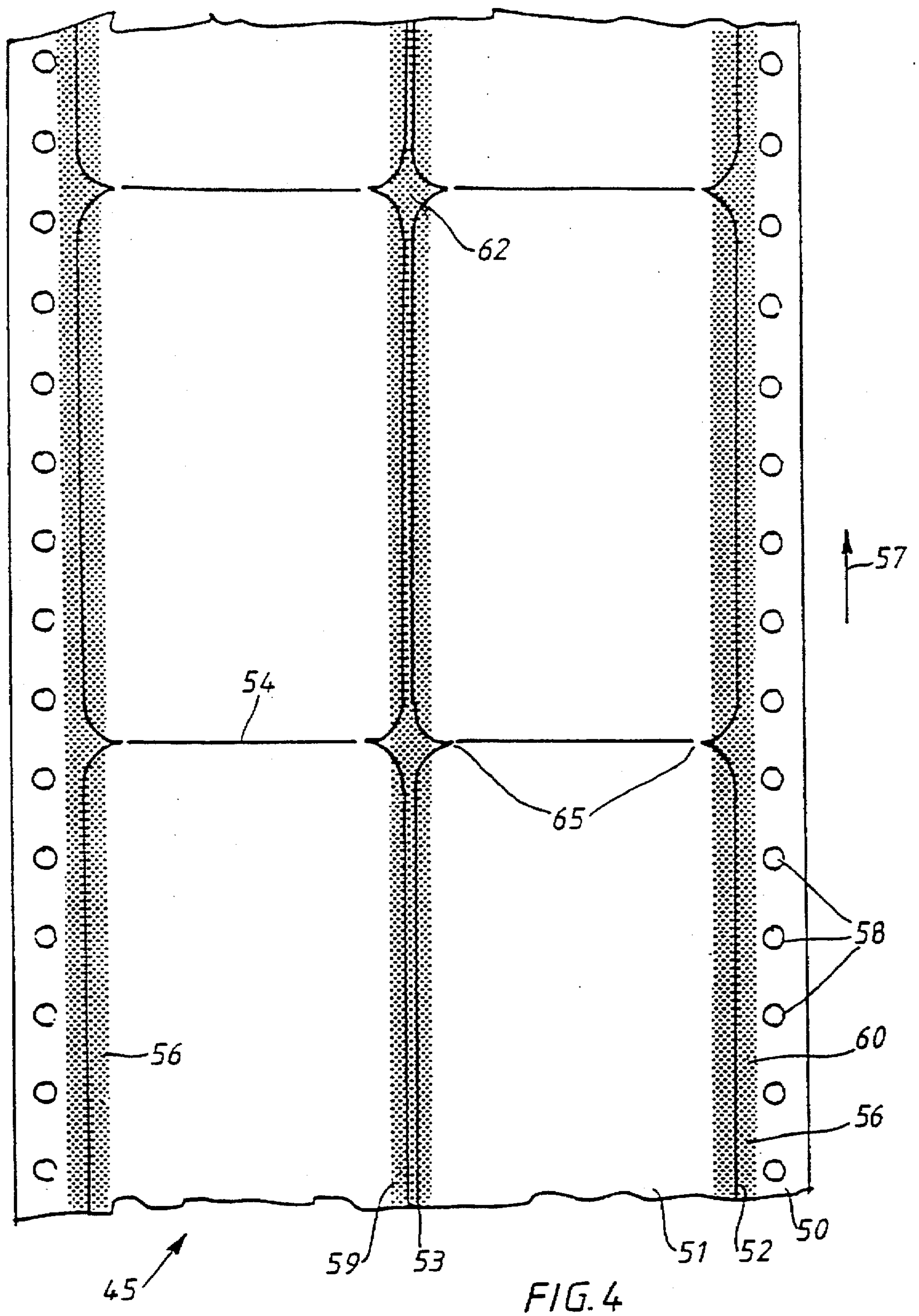
FIG. 4 shows a plan view of a continuous web with adhesive strips extending in the transport direction.
Figure 5:
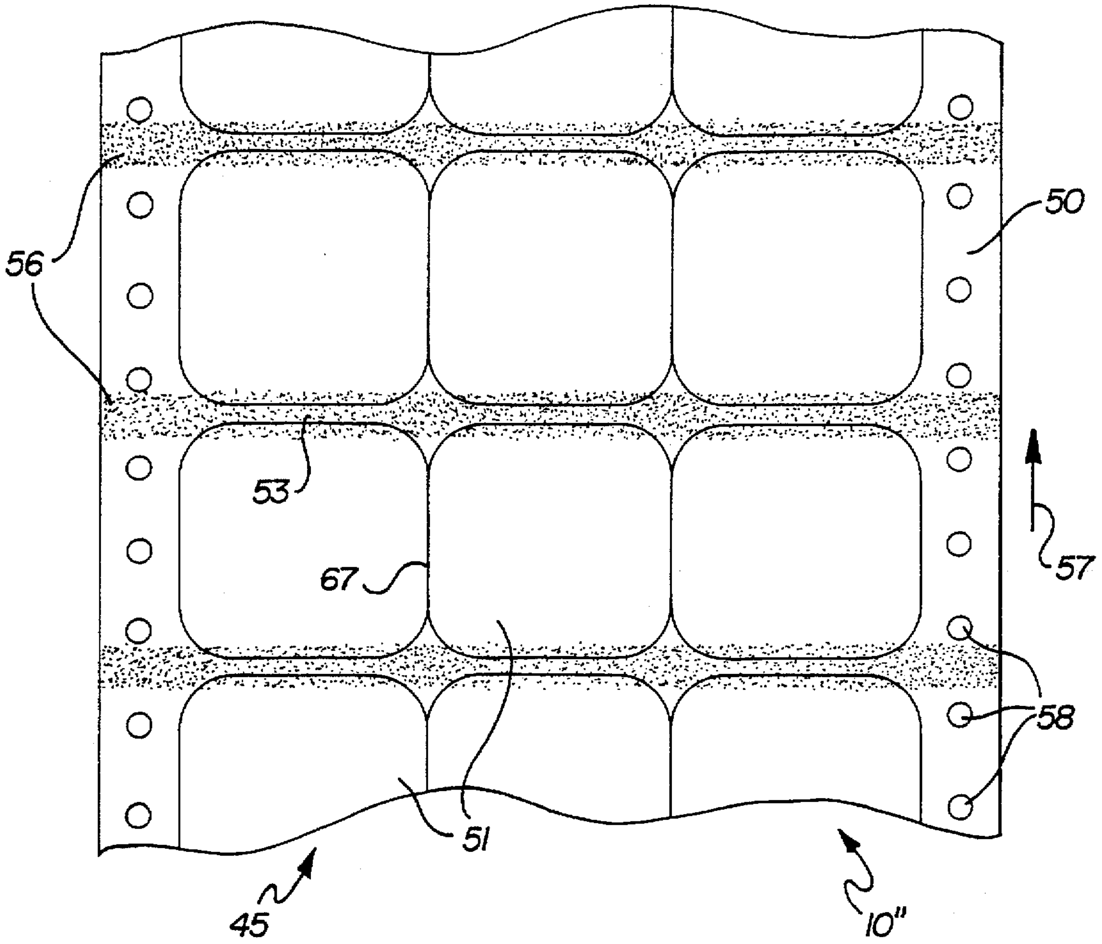
FIG. 5 shows a plan view of a continuous web with adhesive strips running transversely with respect to the transport direction.

In FIGS. 4 and 5 two embodiments are illustrated in which the set is constructed as a continuous web, in which the carrier material extends at least in the transport direction of the continuous web and has an edge region adapted to mechanical transport of the continuous web.

FIG. 4 shows a set in sheet form which is constructed as continuous web 45 and comprises informations carriers 51 which are arranged in two rows and which are enclosed from two sides by carrier material 50 lying in the same plane. The information carriers 51 and the carrier material 50 are completely separated from one another by means of uninterrupted stamped cuts 52. For releasable connection of the information carriers 51 to the carrier material 50 the stamped cuts are covered between the information carrier and the carrier material by a narrow adhesive strip 56 coated on one side with an adhesive. In this embodiment the carrier material 50 extends in the transport direction 57 of the continuous web 45 and thus forms an edge region 60 of the continuous web. Rows of sprocket holes 50 which are adapted to mechanical transport of the continuous web are provided in the carrier material in the transport direction 57 on each side of the continuous web.

The rows of information carriers lying adjacent in the transport direction of the continuous web are separated from one another by a central strip 53. This central strip as well as the adjoining regions of the information carriers 51 are covered by an adhesive strip 59 in order thus to ensure that the continuous web holds together.

In order to increase the internal cohesion of the continuous web, between information carriers which follow one another in the transport direction micro-links 65 can be constructed which leave no or hardly visible remainders on the edge of the information carriers after the separation of the information carriers from one another.

The continuous web illustrated can be folded together like an accordion. For this purpose the continuous web has known folds at specific intervals. In the illustrated continuous web it is possible for the adhesive edges to be adhered on the front or on the subsequent back of the information carriers. The width of the adhesive strips is, similar to the set in sheet form, below 15 mm, preferably 7 to 9 mm.

Between rows of information carriers which lie adjacent in the transport direction a sear 62 is formed at the junction between four information carriers because of the rounding of the corners of each of the information carriers, and this star is advantageously already stamped out before printing of the labels and is mechanically removed so that such a star does not become detached during the printing operation in the printer or cause a blockage. Also the central strip 53 can be removed in continuous web production, for which the rows of labels can be sensibly disposed very close, i.e. approximately 1 mm, adjacent to one another and the adhesive strip 59 can bridge the gap between adjacent rows. In the case of card material with a thickness of 0.2 to 0.25 mm there is no fear of sticking to the accordion-folded strip above it.

For detaching the adhesive strip this strip can be taken up by rollers on the printer after printing of the information carriers end thus can be lifted automatically from the information carriers and the carrier material. If the central strip 53 remains in the set it can be removed together with the adhesive strip from the continuous web after printing of the information carriers.

A cardboard roll, for example, is suitable for rolling up the adhesive strips after printing; this roll rotates as a function of the transport speed of the continuous web and in each case rolls up the adhesive strip. Manuel rotation of the cardboard roll is also possible.

In FIG. 5 a second sheet set constructed as a continuous web 45 is shown, which essentially differs from the embodiment according to FIG. 4 only in that the adhesive strips 56 run transversely with respect to the transport direction 57 of the continuous web 45. In each case three information carriers 512 are disposed adjacent to one another transversely with respect to the transport direction, and are in each case only separated from one another by a stamping line 67.

The rows of information carriers 5i which succeed one another in the transport direction are in turn separated by a central strip 53 which in this embodiment, however, runs transversely with respect to the transport direction 57.

In the production of the set in sheet form according to the invention the information carriers should not move in the slightest between complete stamping out and application of the adhesive strip. If the cards were to move by a few 10 ths of a millimeter relative to one another the cards would easily overlie one another, which would cause difficulties in the further processing or in printing with a laser or inkjer printer.

Figure 8:
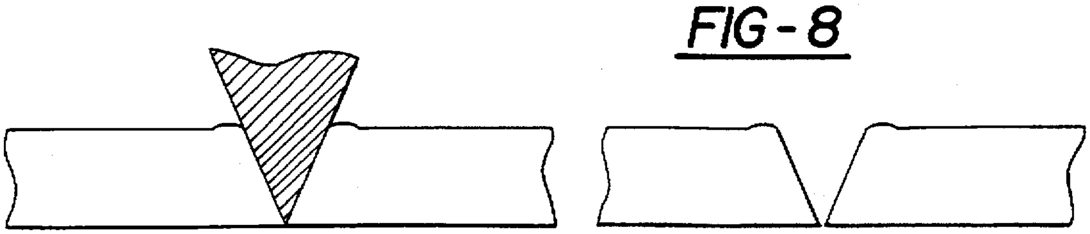
FIG. 8 shows a schematic representation of the stamping operation.

In a flat or rotary stamping or cutting process the material is only separated, but no gap is produced, as is shown in FIG. 8.

Flat stamping processes are precluded, because after the stamping operation there is no longer a linked set but all the components are completely separated from one another. To provide these components lying loosely adjacent to one another with an adhesive strip is technically relatively complicated. It is also not possible to apply the adhesive strip before the stamping operation because one is working against a planar counter-pressure plate and thus the adhesive strip would be cut through again.

Therefore the further object of the invention is to provide apparatus for producing a set according to the invention which avoids the disadvantages of stamping and printing techniques.

This object is achieved according to the invention in that in addition to a stamping arrangement for stamping out information carriers and carrier material and an arrangement for applying the adhesive strip means are also provided which—before the complete separation—temporarily fix the information carriers and the carrier material in their position relative to one another.

An embodiment of this apparatus is explained in greater detail below with the aid of FIGS. 6 and 7.

Figure 6:
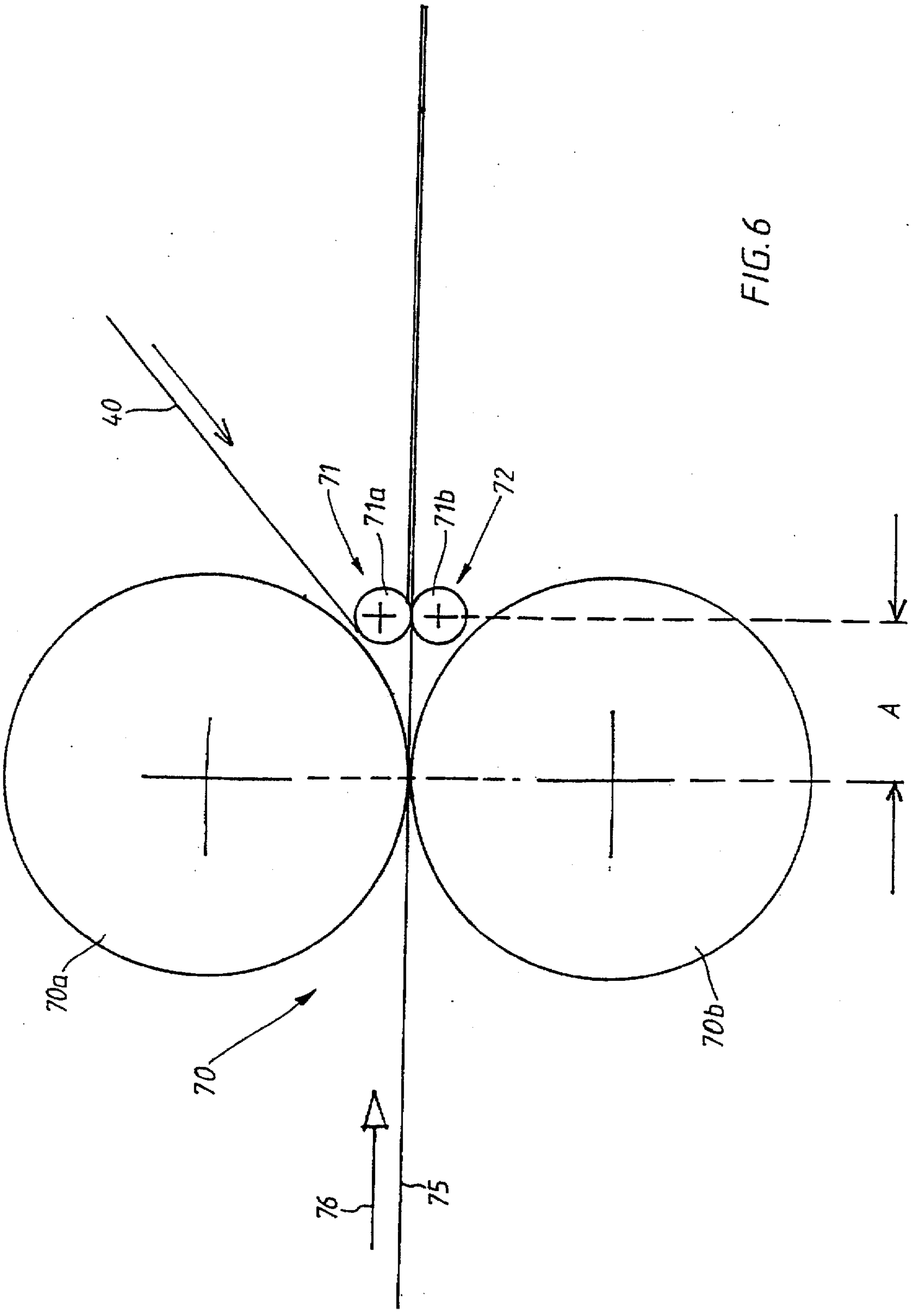
FIG. 6 shows a schematic representation of a device for producing a set in sheet form.
Figure 7:
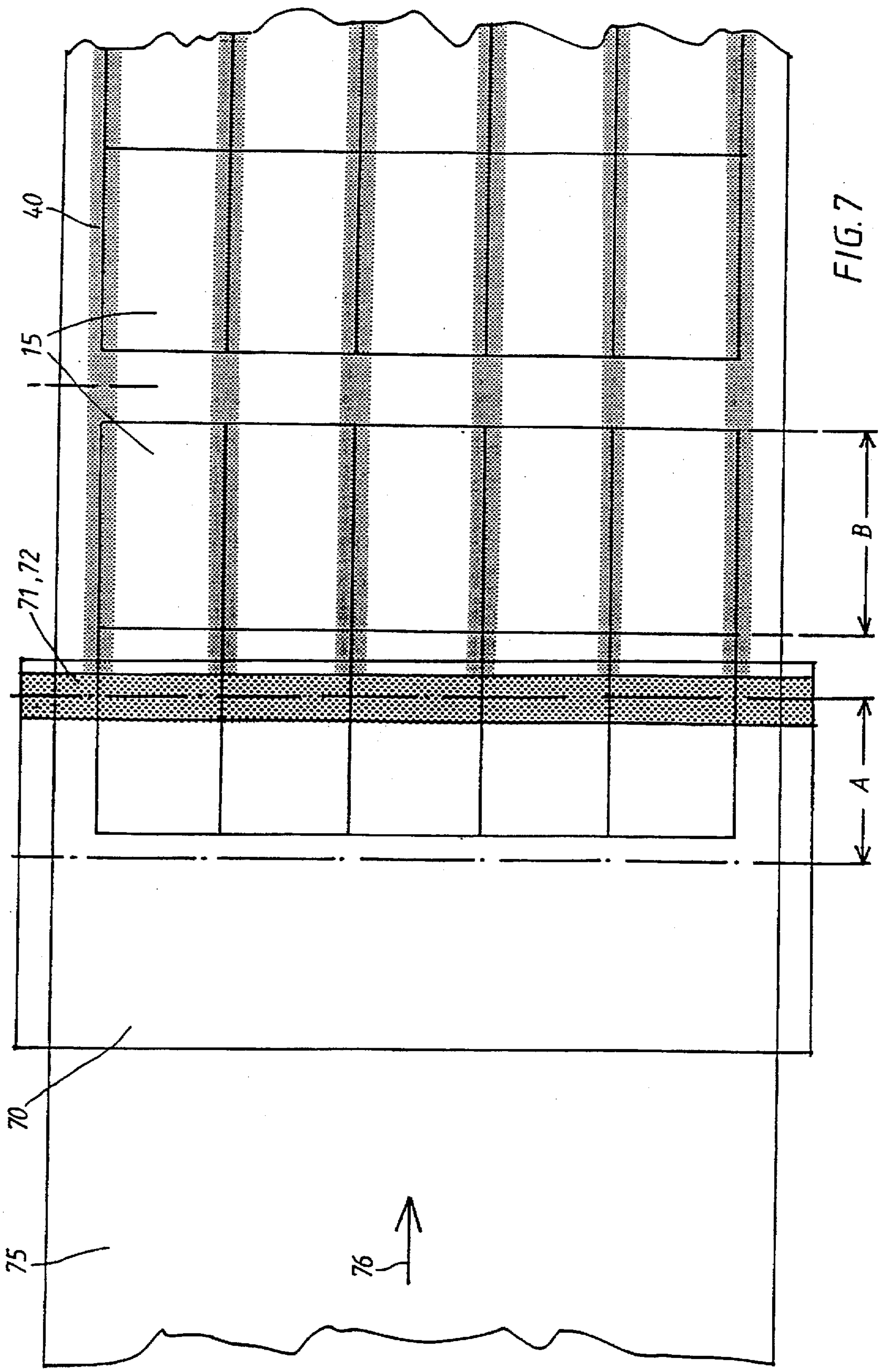
FIG. 7 shows a plan view of the device according to FIG. 6.

The apparatus for producing a set in sheet form which is shown in a schematic side view in FIG. 6 comprises a stamping arrangement 70 for stamping out information carriers and carrier material from a material web 75, an arrangement 71 for application of the adhesive strip 40 and means 72 which—before the complete stamping out—temporarily fix information carriers and carrier material in their position relative to one another. The stamping arrangement 70 is constructed according to the invention for a rotary stamping process and has a stamping cylinder **70*a* and a counter-pressure element 70*b*. In the present embodiment the counter-pressure element 70*b*** is likewise of cylindrical construction but can also for example be constructed as a flat counter-pressure plate.

The arrangement 71 for the application of the adhesive strip 40 comprises a laminating roll **71*a* and a second counter-pressure element 71*b*, which can likewise be either of cylindrical or flat construction. The adhesive strip 40 or a plurality of parallel adhesive strips 40 are delivered by way of the laminating roll 71** and applied to the material web.

The fixing means 72 for fixing information carriers and carrier material are formed in the present embodiment by the laminating roll **71*a* and the second counter-pressure element 71*b*. However, within the scope of the invention it is also possible for independent fixing means, comprised, for example, of rolls which are pressed against one another, to be provided between the stamping arrangement 70 and the arrangement 71** for the application of the adhesive strip. It is equally conceivable to replace one roll by a flat counter-pressure element.

The operation of the apparatus according to the invention will be explained in greater detail below with the aid of FIGS. 6, 7 and **9*a* to 9*d***.

The material web 75, which can comprise for example, of individual sheets of paper or a continuous web is introduced in the direction of the arrow 76 into the stamping arrangement 70, i.e. into the gap between the stamping cylinder **70*a* and the first counter-pressure element 70*b***.

The contours of the information carriers to be stamped out are engraved on the circumferential surface of the stamping cylinder **70*a***.

Figure 9A:
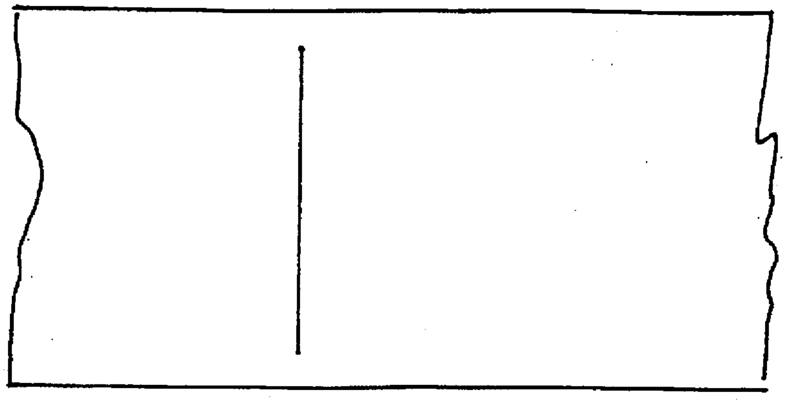
FIGS. 9*a* to 9*d* show various phases in the stamping operation.
Figure 9B:
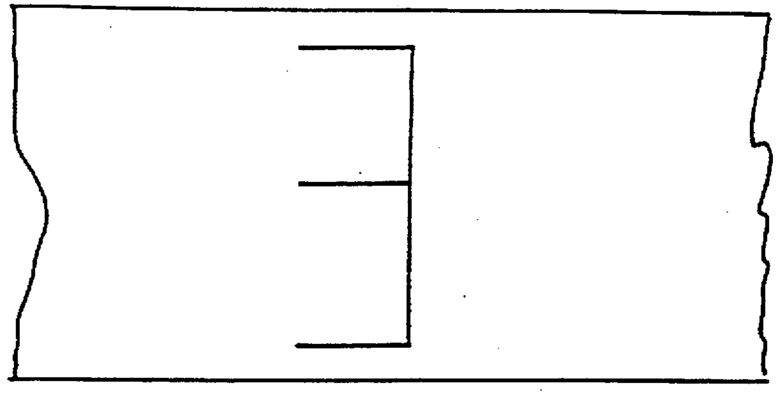
Figure 9C:
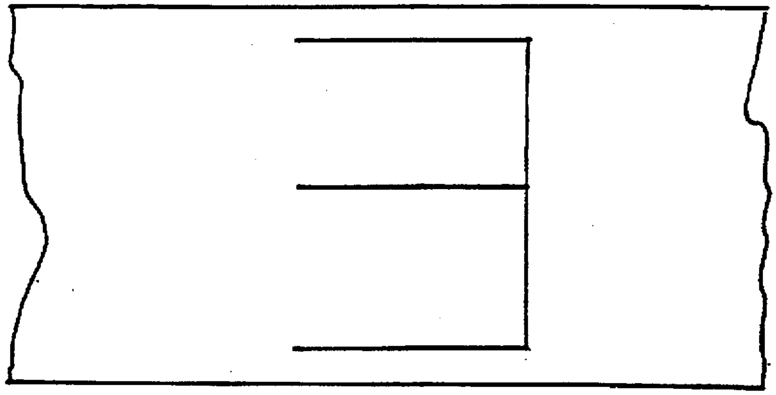
Figure 9D:
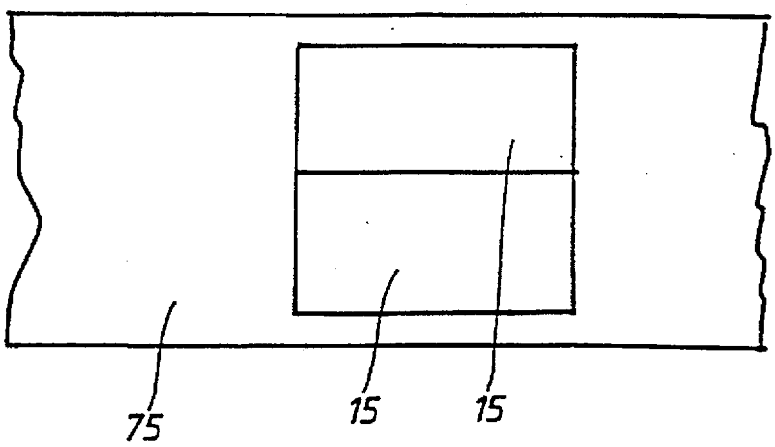

The actual stamping operation is shown in its chronological sequence with the aid of FIGS. **9*a* to 9*d*. In this case it can be seen that the information carriers 15 are not completely stamped out of the material web 75 until the point in time shown in FIG. 9*d*. Thus at this point in time the information carriers 15 would be freely movable. However, the cards should be prevented from moving before the application of the adhesive strip 40. In order to prevent this, according to the invention means 72** are provided which— before the complete stamping out—temporarily fix the information carriers and the carrier material in their position relative to one another. This is achieved in that the material web is gripped by a pressure roll with counter-pressure element in the already stamped-out region of information carrier and carrier material. In the present embodiment this pressure roll is formed by the laminating roll 71*a* and the counter-pressure element by the second counter-pressure element 71*b*. However, it would also be conceivable to construct the fixing means 72 by transport rolls which are disposed between the stamping arrangement 70 and the arrangement 71. In order to ensure a temporary fixing of information carriers and carrier material, the distance A between the stamping arrangement 70 and the fixing means 72 must be chosen to be smaller than the extent B of an information carrier 15 in the transport direction 76 of the material web 75. In this way it is ensured that during a short period of time the information carriers 15 are fixed in their position relative to the carrier material both by the stamping arrangement 70 and also by the fixing means 72.

In the choice of the smallest possible circumference of the stamping cylinder 70*a* and the first counter-pressure element 70*b* as well as by a laminating roll 71*a* also of small diameter with appertaining second counter-pressure element 71*b* the element can be disposed so that a small distance A is produced. In practice measurements between 40 and 50 mm can be achieved.

If a format of the information carriers is chosen in which the extent B in the transport direction of the material web 75 is approximately 10% greater than the distance A, the fixing effect described above can be utilised.

In order to make this operation run as perfectly as possible it is advantageous for not only the stamping cylinder 70*a* but also the laminating roll 71*a* to have an exactly equal peripheral speed. This can be achieved by a corresponding mechanical drive. Furthermore, corresponding guides can be provided between the stamping arrangement 70 and the arrangement 71 in order to ensure and absolutely plane and uniform guiding of the material web 75.

What is claimed is:

1. A set in sheet form comprising:

at least one information carrier card;

carrier material lying in the same plane as said card forming at least a first edge region of the set, said card being completely separated from said carrier material and isolated from any other adjacent components of the set including any additional adjacent carrier cards by means of uninterrupted cuts provided therebetween; and at least one adhesive strip having a predetermined narrow width and coated with releasable glue on one side thereof, said adhesive strip covering at least part of said cuts to adhere the components of said set releasably to one another across said cuts, said card having a width in a direction perpendicular to the course of said adhesive strip that is a multiple of said width of said adhesive strip, said first edge region of said carrier material being aligned generally perpendicularly to the course of said adhesive strip, all such adhesive strips having ends adhered to said first edge region of said carrier material.

2. The set of claim 1 wherein there are at least two of said adhesive strips and said strips are aligned parallel with one another.

3. The set of claim 1 wherein said at least one adhesive strip has a width of less than 10 mm.

4. The set of claim 1 wherein said carrier material provides at least one additional edge region of the set disposed on a side of said set opposite the first edge region.

5. The set of claim 1 wherein there are at least two of said cards and said carrier material includes a central strip provided between said cards.

6. The set of claim 1 wherein said card is surrounded on all sides by said carrier material.

7. The set of claim 1 wherein said set is constructed as a continuous web having a direction of transport, said carrier material extending at least in said transport direction of said web and having edge regions adapted to facilitate mechanical transport of said web.

8. The set of claim 7 wherein said course of said at least one adhesive strip extends transverse to said direction of transport.

9. The set of claim 7 wherein said course of said at least one adhesive strip extends in said direction of transport.

10. The set of claim 9 wherein there are at least two of said cards succeeding one another in said transport direction and at least one micro-link interconnecting said cards.

* * * * *

UNITED STATES PATENT AND TRADEMARK OFFICE

CERTIFICATE OF CORRECTION

PATENT NO. : 5,702,789

DATED : December 30, 1997

INVENTOR(S) : Paul Fernandez-Kirchberger, Joachim Seidl

It is certified that error appears in the above-indentified patent and that said Letters Patent is hereby corrected as shown below:

Column 2, line 62, change "brines" to -- brings --.

Column 5, line 26, change "36" to -- 26 --.

Column 6, line 26, change "end" to -- and --.

Column 7, line 12, change "sear" to -- star --; line 46, change "5i" to -- 51 --; line 56, change "inkier" to -- inkjet --.

Signed and Sealed this

Third Day of March, 1998

Attest:

BRUCE LEHMAN

*Attesting Officer*

*Commissioner of Patents and Trademarks*

US005702789B1

(12) REEXAMINATION CERTIFICATE (4429th)

United States Patent

Fernandez-Kirchberger et al.

(10) Number: US 5,702,789 C1

(45) Certificate Issued: Aug. 28, 2001

(54) SET IN SHEET FORM AS WELL AS APPARATUS AND METHOD FOR PRODUCING SUCH A SET

(75) Inventors: Paul Fernandez-Kirchberger, München; Joachim Seidl, Rechtmehring, both of (DE)

(73) Assignee: MTL Modern Technologies Lizenz GmbH, Munich (DE)

Reexamination Request:
No. 90/005,826, Sep. 29, 2000

Reexamination Certificate for:

| | |
|---|---|
| Patent No.: | **5,702,789** |
| Issued: | **Dec. 30, 1997** |
| Appl. No.: | **08/447,973** |
| Filed: | **May 23, 1995** |

Certificate of Correction issued Mar. 3, 1998.

(30) Foreign Application Priority Data

| | | |
|---|---|---|
| Jun. 8, 1994 | (DE) | 44 20 027 |
| Sep. 13, 1994 | (DE) | 44 32 544 |
| Mar. 8, 1995 | (DE) | 295 03 990 U |

(51) Int. Cl.[7] .......... B32B 3/10

(52) U.S. Cl. .......... 428/40.1; 428/42.2; 428/42.3; 428/43; 428/57; 428/58; 428/61; 283/81

(58) Field of Search .......... 428/40.1, 42.2, 428/42.3, 43, 58, 61; 283/81

(56) References Cited

FOREIGN PATENT DOCUMENTS

| | | | |
|---|---|---|---|
| 8807521 | 1/1989 | (DE) | B31D/1/00 |
| 4240825 | 6/1994 | (DE) | B31D/1/00 |

*Primary Examiner*—Alexander Thomas

(57) ABSTRACT

The invention relates to a set in sheet form as well as to apparatus and a method for producing such a set, which consists of at least one information carrier in card form with carrier material lying in the same plane, wherein the information carrier and the carrier material are completely separated from one another by means of uninterrupted stamped cuts or the like and For the releasable connection of information carrier and carrier material at least one narrow adhesive strip is provided which is coated with a glue on one side, covers at least a part of the stamped cuts between adjacent rows of information carriers and/or between information carriers and carrier material and adheres the components of the set to one another. The width of the information carriers perpendicular to the course of the adhesive strip amounts to a multiple of the width of the adhesive strip.

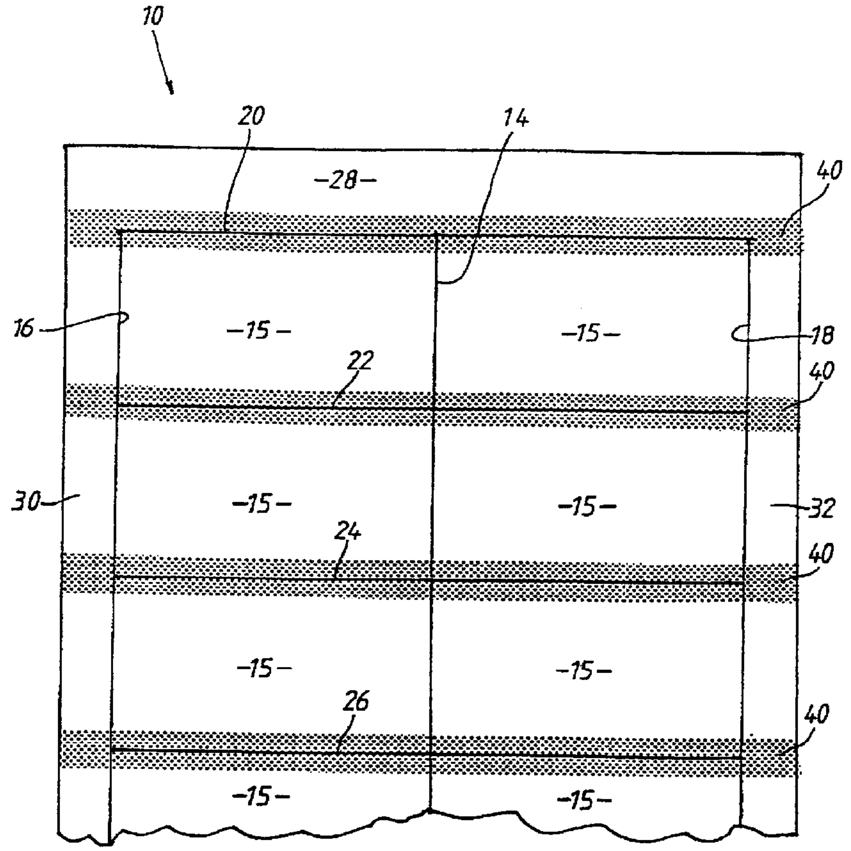

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *

US005702789C2

(12) EX PARTE REEXAMINATION CERTIFICATE (8893rd)

United States Patent
Fernandez-Kirchberger et al.

(10) Number: US 5,702,789 C2

(45) Certificate Issued: Mar. 6, 2012

(54) SET IN SHEET FORM AS WELL AS APPARATUS AND METHOD FOR PRODUCING SUCH A SET

(75) Inventors: Paul Fernandez-Kirchberger, München (DE); Joachim Seidl, Rechtmehring (DE)

(73) Assignee: Avery Dennison Deutschland GmbH, Eching (DE)

Reexamination Request:
No. 90/011,497, Feb. 18, 2011

Reexamination Certificate for:

| | |
|---|---|
| Patent No.: | **5,702,789** |
| Issued: | **Dec. 30, 1997** |
| Appl. No.: | **08/447,973** |
| Filed: | **May 23, 1995** |

Reexamination Certificate C1 5,702,789 issued Aug. 28, 2001

Certificate of Correction issued Mar. 3, 1998.

(30) Foreign Application Priority Data

| | | |
|---|---|---|
| Jun. 8, 1994 | (DE) | 44 20 027 |
| Sep. 13, 1994 | (DE) | 44 32 544 |
| Mar. 8, 1995 | (DE) | 295 03 990 U |

(51) Int. Cl.
*B42D 5/00* (2006.01)
*B42D 5/02* (2006.01)

(52) U.S. Cl. ..................... 428/40.1; 428/42.2; 428/42.3; 428/43; 428/57; 428/58; 428/61; 283/81

(58) Field of Classification Search ........................ None
See application file for complete search history.

(56) References Cited

To view the complete listing of prior art documents cited during the proceeding for Reexamination Control Number 90/011,497, please refer to the USPTO's public Patent Application Information Retrieval (PAIR) system under the Display References tab.

*Primary Examiner*—Stephen Stein

(57) ABSTRACT

The invention relates to a set in sheet form as well as to apparatus and a method for producing such a set, which consists of at least one information carrier in card form with carrier material lying in the same plane, wherein the information carrier and the carrier material are completely separated from one another by means of uninterrupted stamped cuts or the like and For the releasable connection of information carrier and carrier material at least one narrow adhesive strip is provided which is coated with a glue on one side, covers at least a part of the stamped cuts between adjacent rows of information carriers and/or between information carriers and carrier material and adheres the components of the set to one another. The width of the information carriers perpendicular to the course of the adhesive strip amounts to a multiple of the width of the adhesive strip.

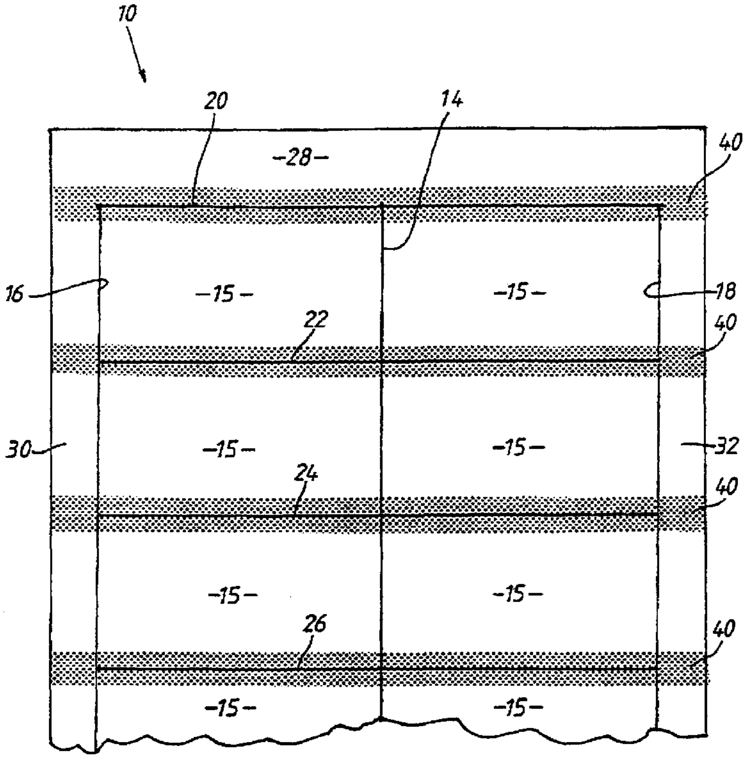

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 6 is cancelled.

Claims 1 and 5 are determined to be patentable as amended.

Claims 2-4 and 7-9, dependent on an amended claim, are determined to be patentable.

New claims 11-21 are added and determined to be patentable.

Claim 10 was not reexamined.

1. A set in sheet form comprising:

at least [one] *two* information carrier [card] *cards with at least two of the cards being adjacent to each other*;

carrier material lying in the same plane as said [card] *cards* forming at least a first edge region of the set, said [card] *cards* being completely separated from said carrier material and isolated from any other adjacent components of the set including any additional adjacent carrier cards by means of *only* uninterrupted cuts provided therebetween; and at least one adhesive strip having a predetermined narrow width and coated with releasable glue on one side thereof, said adhesive strip covering at least part of said cuts to adhere the components of said set releasably to one another across said cuts, [said] *each* card having a width in a direction perpendicular to the course of said adhesive strip that is a multiple of said width of said adhesive strip, said first edge region of said carrier material being aligned generally perpendicularly to the course of said adhesive strip, all such adhesive strips having ends adhered to said first edge region of said carrier material.

5. The set of claim 1 wherein there are at least [two] *three* of said cards and said carrier material includes a central strip provided between *two of said at least three of* said cards.

*11. The set of claim 1 wherein said cards and the carrier material are constructed from the same material web.*

*12. The set of claim 1 wherein there are at least four information carrier cards with a single adhesive strip covering at least part of each of the at least four information carrier cards.*

*13. The set of claim 1 wherein there are at least four information carrier cards arranged in at least a two by two arrangement and a single adhesive strip covering at least a part of each of the at least four information carrier cards.*

*14. A set in sheet form comprising:*

*at least two information carrier cards with at least two of the cards being adjacent to each other;*

*carrier material lying in the same plane as said cards forming at least a first edge region of the set, said cards being completely separated from said carrier material and isolated from any other adjacent components of the set including any additional adjacent carrier cards by means of only uninterrupted cuts provided therebetween; and*

*at least one adhesive strip having a predetermined narrow width and coated with releasable glue on one side thereof, said adhesive strip covering at least part of said cuts to adhere the components of said set releasably to one another across said cuts, each card having a width in a direction perpendicular to the course of said adhesive strip that is greater than said width of said adhesive strip, said first edge region of said carrier material being aligned generally perpendicularly to the course of said adhesive strip, all such adhesive strips having ends adhered to said first edge region of said carrier material.*

*15. A set in sheet form comprising:*

*a sheet;*

*at least two information carrier cards in the sheet with at least two of the cards being adjacent to each other;*

*a carrier material in the sheet lying in the same plane as the at least two information carrier cards, said carrier material forming at least a first edge region of the sheet, and said cards being completely separated from the carrier material and isolated from any other adjacent components of the set including any additional adjacent carrier cards by only uninterrupted cuts provided therebetween; and*

*at least one adhesive strip having a predetermined narrow width and coated with releasable glue on one side thereof;*

*wherein:*

*the at least two information carrier cards and the carrier material are components of the set,*

*the at least one adhesive strip covers at least a part of the uninterrupted cuts to adhere the components of the set releasably to one another across the uninterrupted cuts,*

*each card having a width in a direction perpendicular to a course of the adhesive strip that is greater than the predetermined narrow width of the at least one adhesive strip,*

*the first edge region of the sheet is aligned generally perpendicularly to the course of the adhesive strip,*

*all of the at least one adhesive strips have ends adhered to the first edge region of the sheet, and*

*the at least two information carrier cards and the carrier material are constructed from the same material web.*

*16. The set of claim 14 wherein said cards and the carrier material are constructed from the same material web.*

*17. The set of claim 14 wherein there are at least three of said cards and said carrier material includes a central strip provided between two of said at least three of said cards.*

*18. The set of claim 14 wherein there are at least four information carrier cards arranged in at least a two by two arrangement and a single adhesive strip covering at least a part of each of the at least four information carrier cards.*

*19. The set of claim 15 wherein there are at least three of said cards and said carrier material includes a central strip provided between two of said at least three of said cards.*

*20. The set of claim 15 wherein there are at least four information carrier cards arranged in at least a two by two*

*arrangement and a single adhesive strip covering at least a part of each of the at least four information carrier cards.*

*21. A set in sheet form comprising:*

*at least one information carrier card;*

*carrier material lying in the same plane as said card forming at least a first edge region of the set, said card being completely separated from said carrier material and isolated from any other adjacent components of the set including any additional adjacent carrier cards by means of only uninterrupted cuts provided therebetween; and*

*at least one adhesive strip having a predetermined narrow width and coated with releasable glue on one side thereof, said adhesive strip covering at least part of said cuts to adhere the components of said set releasably to one another across said cuts, said card having a width in a direction perpendicular to the course of said adhesive strip that is a multiple of said width of said adhesive strip, said first edge region of said carrier material being aligned generally perpendicularly to the course of said adhesive strip, all such adhesive strips having ends adhered to said first edge region of said carrier material,*

*wherein said set is constructed as a continuous web having a direction of transport, said carrier material extending at least in said transport direction of said web and having edge regions adapted to facilitate mechanical transport of said web,*

*wherein said course of said at least one adhesive strip extends in said direction of transport, and*

*wherein there are at least two of said cards succeeding one another in said transport direction and at least one micro-link interconnecting said cards.*

* * * * *